E. M. MORGAN.
EGG BEATER.
APPLICATION FILED JUNE 19, 1907.
974,586.
Patented Nov. 1, 1910.
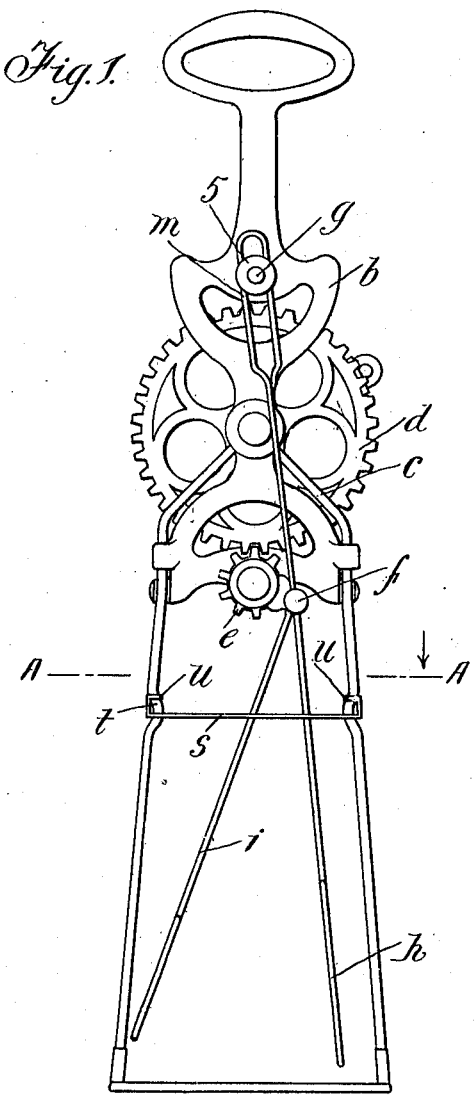
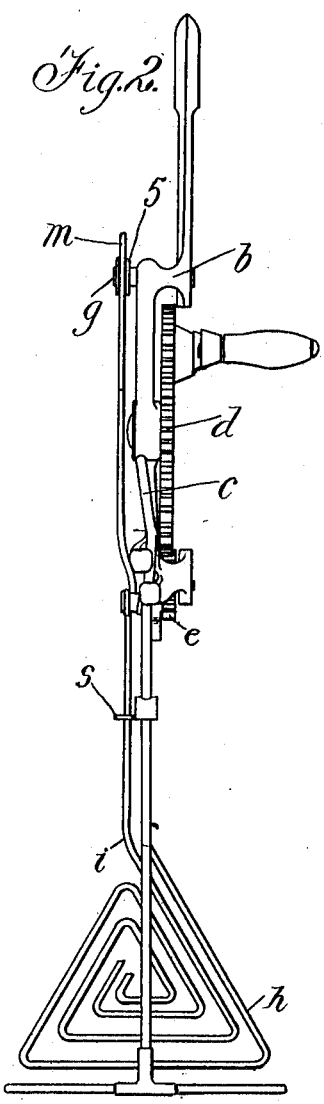
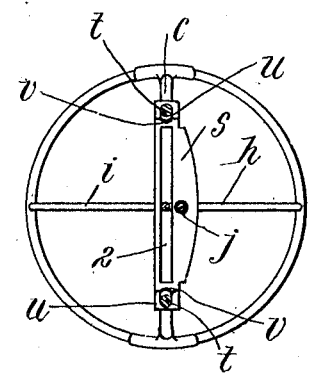

UNITED STATES PATENT OFFICE.

EDWARD MOMPESSON MORGAN, OF WESTMOUNT, QUEBEC, CANADA.

EGG-BEATER.

974,586.   Specification of Letters Patent.   Patented Nov. 1, 1910.

Application filed June 19, 1907. Serial No. 379,793.

*To all whom it may concern:*

Be it known that I, EDWARD MOMPESSON MORGAN, of the town of Westmount, in the district of Montreal, Province of Quebec, Canada, have invented certain new and useful Improvements in Egg-Beaters; and I do hereby declare that the following is a full, clear, and exact description of the same.

My invention relates particularly to the type of egg beaters disclosed in Letters Patent of the United States of America granted to me on December 6, 1904, under No. 776,791, and it has for its object to simplify the construction thereof without detracting from its effectiveness. To this end I form the upper end of the longer of a pair of beater arms with a longitudinal loop whereby it is slidably fulcrumed upon a stud on the beater frame and pivotally operatively connected to a crank arm upon a spur pinion driven by a larger spur gear, the shorter arm being fulcrumed in a transverse portion of the beater frame and pivotally operatively connected to the said crank arm, such transverse portion of the frame being adapted to also serve as a guide for the long beater arm to prevent displacement of the latter away from the short arm. For full comprehension, however, of my invention, reference must be had to the accompanying drawings forming a part of this specification, in which similar reference characters indicate the same parts, and wherein:

Figure 1 is a side elevation of an egg beater constructed according to my invention; Fig. 2 is a similar view taken at right angles; and Fig. 3 is a transverse sectional view taken on line A A Fig. 1 looking down.

The main frame $b$ of the device has a wire support $c$ secured rigidly to its lower end and a driving spur gear $d$ and a driven spur pinion $e$ mounted thereon in position intermeshing with each other, while a crank pin $f$ projects from the pinion and a rigid stud $g$ projects from the frame above and in a line projected through the centers of the gear and pinion.

A long beater arm $h$ is fulcrumed at its upper end slidably upon the stud $g$ and operatively pivotally connected at a point between its ends to the crank pin, and a short beater arm $i$ is operatively pivotally connected at its upper end to the said crank pin and fulcrumed in a perforation $j$ in a transverse portion of the frame.

Each beater arm is formed from a single strand of wire, the long arm being bent back upon itself to form a loop $m$ longitudinally thereof, and it is coiled at, approximately, its middle, around the crank pin; while the short beater arm has its upper end coiled around the crank pin, and the lower end of each arm is bent to substantially volutoid form, the beating end of the large arm being of greater area than the corresponding end of the short arm.

The above mentioned transverse portion of the frame, in which the short beater arm is fulcrumed, consists preferably of a plate $s$ having a pair of perforations $v$, near its opposite ends through which it is set on inwardly offset portions $t$ of the wire legs of the support $c$, and each end is forked as at $u$ to, when bent back over the body of the plate, straddle the said wire legs and, together with the inwardly off-set portions $t$ and the said perforations $v$, securely retain such plate against displacement. The perforation $j$ is formed midway of the length of this plate, and a slot 2 extends from end to end thereof and accommodates and acts as a guide for the long beater arm, keeping the latter parallel to the short arm, and thereby preventing the beating ends from striking during operation.

A flanged roller 5 is riveted rotatably upon the end of the stud $g$, and its purpose is to retain the looped upper end of the long beater arm against displacement axially relatively to such stud, and at the same time act as an anti-friction device to facilitate the reciprocation of the said long arm.

The operation of my improved device is as follows:—As the driving gear drives the pinion the crank pin will vertically reciprocate both beater arms in unison, rock the shorter arm in the perforation $j$ in the plate $s$, and oscillate the longer arm on the stud $g$.

What I claim is as follows:—

1. In an egg beater, the combination of a supporting frame having a hand driven spur gear and a spur pinion intermeshing therewith, such pinion having a pin projecting parallel to its axis; a stud upon the upper part of the supporting frame, a beater arm consisting of a single strand of wire with its upper end bent back upon itself in the form of a longitudinal loop to fit slidably upon the stud, its middle being pivoted upon the said pin, and its lower end formed as a beater, a transverse plate carried by the support beneath and adjacent to the pinion and having a slot to accommodate and guide the said beater arm, and a central perforation; and a shorter beater arm passed upwardly through the said perforation and pivotally connected at its upper end to the pin upon the said pinion, the beating ends of such beater arms being constructed to pass each other in their operation.

2. In an egg beater, the combination with a carrying frame, of a revoluble member mounted upon such frame, a beater arm pivotally connected to the said revoluble member, a transverse guiding member carried by the frame at one side of the revoluble member and allowing movement of the arm transversely to the frame and preventing undue displacement of the said arm at right angles to the said movement, and means slidably fulcruming such arm to the frame at a point at the opposite side of the revoluble member, and means for operating the revoluble member.

3. In an egg beater, the combination with a carrying frame, of a revoluble member mounted upon such frame, a long beater arm pivotally connected between its ends to the said revoluble member, a short beater arm pivotally connected at its upper end to such revoluble member, a transverse member at one side of the revoluble member and presenting a guiding slot and a perforation the long arm working in the slot and the short arm working in the perforation, and means slidably fulcruming such long arm to the frame at a point at the opposite side of the revoluble member, and means for operating the revoluble member.

4. In an egg beater, the combination with a carrying frame, of a revoluble member mounted upon such frame, a long beater arm pivotally connected between its ends to the said revoluble member, a short beater arm pivotally connected at its upper end to such revoluble member, a transverse member carried by the frame below the revoluble member and presenting a guiding slot and a perforation the long arm working in the slot and the short arm working in the perforation, a stud upon the upper part of the frame, the upper end of the long beater arm being formed with a longitudinal slot slidably engaging the said stud, and means for operating the revoluble member.

5. In an egg beater, the combination with a carrying frame, of a revoluble member mounted upon such frame, a long beater arm pivotally connected between its ends to the said revoluble member, a short beater arm pivotally connected at its upper end to such revoluble member, a transverse member carried by the frame below the revoluble member and presenting a guiding slot and a perforation the long arm working in the slot and the short arm working in the perforation; a stud upon the upper part of the frame, a flanged roller mounted rotatably upon the said stud, the upper end of the long beater arm being formed with a longitudinal slot slidably engaging the said roller between the flanges of the latter, and means for operating the revoluble member.

In testimony whereof, I have signed my name to this specification, in the presence of two subscribing witnesses.

EDWARD MOMPESSON MORGAN.

Witnesses:
WILLIAM P. McFEAT,
ARTHUR H. EVANS.